(12) United States Patent
Fung et al.

(10) Patent No.: US 7,689,529 B2
(45) Date of Patent: Mar. 30, 2010

(54) SYSTEM AND METHOD FOR APPLICATION BALANCED SCORECARD OPTIMIZER

(75) Inventors: James S. Fung, Thornhill (CA); Ray A. Kingdon, Burlington (CA); Jacek P. Maryan, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 11/400,004

(22) Filed: Apr. 6, 2006

(65) Prior Publication Data
US 2007/0239511 A1    Oct. 11, 2007

(51) Int. Cl.
*G06N 7/02* (2006.01)
*G06N 7/06* (2006.01)

(52) U.S. Cl. .............................. 706/52; 705/35; 705/7
(58) Field of Classification Search .................. 705/36; 706/52; 707/2
See application file for complete search history.

(56) References Cited

U.S. PATENT DOCUMENTS

| | | | |
|---|---|---|---|
| 2002/0019790 A1* | 2/2002 | Edgar et al. .................... 705/36 |
| 2003/0110112 A1* | 6/2003 | Johnson et al. ................ 705/36 |
| 2003/0236732 A1 | 12/2003 | Cimral et al. .................. 705/36 |
| 2004/0225591 A1 | 11/2004 | Chiappetta et al. ............. 705/36 |
| 2006/0184410 A1* | 8/2006 | Ramamurthy et al. .......... 705/8 |

* cited by examiner

*Primary Examiner*—David R Vincent
*Assistant Examiner*—Kalpana Bharadwaj
(74) *Attorney, Agent, or Firm*—Scully, Scott, Murphy & Presser, P.C.; Ronald A. Kaschak

(57) ABSTRACT

There is disclosed a system and method for managing an application portfolio. In an embodiment, a system is designed to provide a balanced, cohesive, end-to-end approach to application portfolio management. Taking into account a number of decision drivers for application portfolio management (e.g. business drivers, technology drivers, financial drivers, and staffing/labor drivers), the system attempts to process this information, using one or more fuzzy logic algorithms derived from one or more expert knowledge bases, into an actionable implementation plan and business case. Upon validation of the implementation plan and business case, one or more of the expert knowledge bases may be updated with additional expert knowledge.

8 Claims, 10 Drawing Sheets

| Category | Influence |
|---|---|
| Operability | 50% |
| Supportability | 30% |
| Maintainability | 20% |

FIG. 3A

| Operability | Rank | Group | Weight |
|---|---|---|---|
| O - Presentation Layer O/S | 1 | 0 | 5 |
| AS - Servers - O/S | 2 | 0 | 4 |
| BA -Data / Database - O/S | 3 | 0 | 4 |
| BB - Underlyinh DB Product | 4 | 0 | 4 |
| BU - No Concurrent Users | 5 | 0 | 2 |
| DV - Transactional Peak Times | 6 | 0 | 2 |
| DL - Production Cycles | 7 | 0 | 2 |
| DS - Web Accessible | 8 | 0 | 2 |
| DT - HW Requirements | 9 | 0 | 1 |
| DV - Duplicate Functionality | 10 | 0 | 1 |

FIG. 3B

| Operability | ABC | DEF | GHI |
|---|---|---|---|
| O - Presentation Layer O/S | 0 | 0 | 7.5 |
| AS - Servers - O/S | 0 | 0 | 4 |
| BA - Data / Database - O/S | 10 | 10 | 4 |
| BB - Underlyinh DB Product | 0 | 0 | 10 |
| BU - No Concurrent Users | 0 | 0 | 1 |
| DV - Transactional Peak Times | 0 | 0 | 2 |
| DL - Production Cycles | 0 | 0 | 0 |
| DS - Web Accessible | 0 | 0 | 0 |
| DT - HW Requirements | 0 | 0 | 2.5 |
| DV - Duplicate Functionality | 0 | 0 | 2.5 |
| Total | 10 | 10 | 33.5 |

FIG. 3E

SYSTEM AND METHOD FOR APPLICATION BALANCED SCORECARD OPTIMIZER

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The present invention relates to systems and methods for application portfolio management and optimization.

Companies are looking for an objective, measurable approach to application portfolio management that would allow them to put their increasingly scarce technology resources to work in a more beneficial way. While a number of solutions have been previously proposed to assist companies in managing their information technology (IT) application portfolio, earlier proposed solutions have been mostly administrative tools that focus on optimization of large budget items and activities and that provide a rather fragmented view from one or two aspects, usually weighted heavily towards technology or finance. Improved systems and methods for application portfolio management and optimization are needed.

SUMMARY

The present invention relates to systems and methods for application portfolio management and optimization.

In an aspect of the invention, there is provided a data processing system implemented method for managing an application portfolio, comprising: for each application in the application portfolio, collecting data for a plurality of decision drivers; processing questions relating to the decision drivers to output attributes based on a predetermined mapping; applying a first fuzzy logic algorithm on the output attributes and performing at least one of scoring, filtering and categorizing; and based on performing at least one of scoring, filtering and categorizing, outputting application options.

In an embodiment, the method further comprises: applying a second fuzzy logic algorithm to the output application options; and outputting application dispositions.

In another embodiment, the method further comprises: applying a third fuzzy logic algorithm to group the output application options; and outputting a list of initiatives.

In another embodiment, the method further comprises: applying a fourth fuzzy logic algorithm to perform at least one of costing, optimizing and scheduling on the list of initiatives; and outputting an implementation plan and a business case.

In another embodiment, the method further comprises deriving each fuzzy logic algorithm from an expert knowledge base.

In yet another embodiment, the method further comprises maintaining each expert knowledge base in a mathematical form.

In still another embodiment, the method further comprises updating at least one expert knowledge base upon validation of the implementation plan and business case.

In another aspect of the invention, there is provided a system for managing an application portfolio, comprising: means for collecting data for a plurality of decision drivers for each application in the application portfolio; means for processing questions relating to the decision drivers to output attributes based on a predetermined mapping; means for applying a first fuzzy logic algorithm on the output attributes and performing at least one of scoring, filtering and categorizing; and means for outputting application options based on performing at least one of scoring, filtering and categorizing.

In an embodiment, the system further comprises: means for applying a second fuzzy logic algorithm to the output application options; and means for outputting application dispositions.

In another embodiment, the system further comprises: means for applying a third fuzzy logic algorithm to group the output application options; and means for outputting a list of initiatives.

In another embodiment, the system further comprises: means for applying a fourth fuzzy logic algorithm to perform at least one of costing, optimizing and scheduling on the list of initiatives; and means for outputting an implementation plan and a business case.

In another embodiment, the system further comprises means for deriving each fuzzy logic algorithm from an expert knowledge base.

In yet another embodiment, the system further comprises means for maintaining each expert knowledge base in a mathematical form.

In still another embodiment, the system further comprises means for updating at least one expert knowledge base upon validation of the implementation plan and business case.

In another aspect of the invention, there is provided a data processor readable medium storing data processor code that, when loaded into a data processing device, adapts the device to execute a method for managing an application portfolio, the data processor readable medium including: code for collecting data for a plurality of decision drivers for each application in the application portfolio; code for processing questions relating to the decision drivers to output attributes based on a predetermined mapping; code for applying a first fuzzy logic algorithm on the output attributes and performing at least one of scoring, filtering and categorizing; and code for outputting application options based on performing at least one of scoring, filtering and categorizing.

In an embodiment, the data processor readable medium further includes: code for applying a second fuzzy logic algorithm to the output application options; and code for outputting application dispositions.

In another embodiment, the data processor readable medium further includes: code for applying a third fuzzy logic algorithm to group the output application options; and code for outputting a list of initiatives.

In another embodiment, the data processor readable medium further includes: code for applying a fourth fuzzy logic algorithm to perform at least one of costing, optimizing and scheduling on the list of initiatives; and code for outputting an implementation plan and a business case.

In yet another embodiment, the data processor readable medium further includes code for maintaining each expert knowledge base in a mathematical form.

In another embodiment, the data processor readable medium further includes code for updating at least one expert knowledge base upon validation of the implementation plan and business case.

These and other aspects of the invention will become apparent from the following more particular descriptions of exemplary embodiments.

BRIEF DESCRIPTION OF THE DRAWINGS

In the figures which illustrate exemplary embodiments of the invention:

FIGS. 3A-3E show an illustrative example of an optimization calculation in accordance with an embodiment.

DETAILED DESCRIPTION

As noted above, the present invention relates to systems and methods for application balanced scorecard optimizer.

Figure 1:
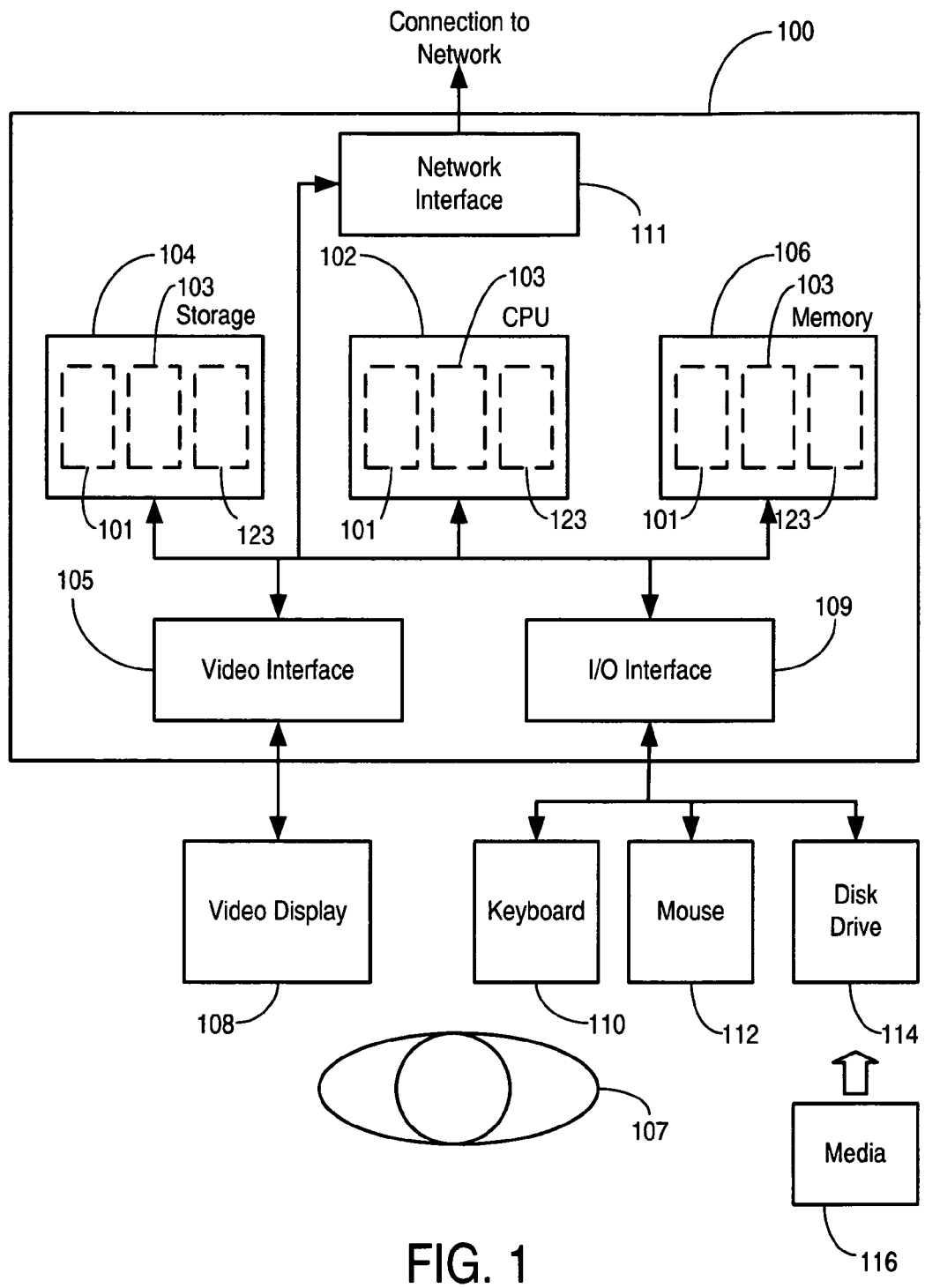
FIG. 1 shows a generic data processing system that may provide a suitable operating environment.

The invention may be practiced in various embodiments. A suitably configured data processing system, and associated communications networks, devices, software and firmware may provide a platform for enabling one or more of these systems, methods, and tools. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Now referring to FIGS. 2A-2E, shown is an illustrative block diagram of an application balanced scorecard optimizer (ABSCO) system 200 in accordance with an embodiment. As shown in FIGS. 2A-2E, the ABSCO system 200 is configured to decompose the application portfolio management problem into a structured and balanced hierarchy of decision drivers. In the illustrative example in FIGS. 2A-2E, the decision drivers include: (i) Business Driver(s), (ii) Technology Driver(s), (iii) Finance Driver(s), and (iv) Labour Driver(s). Together, these decision drivers may be used to comprehensively model the dynamics of managing an application portfolio.

Figure 2A:
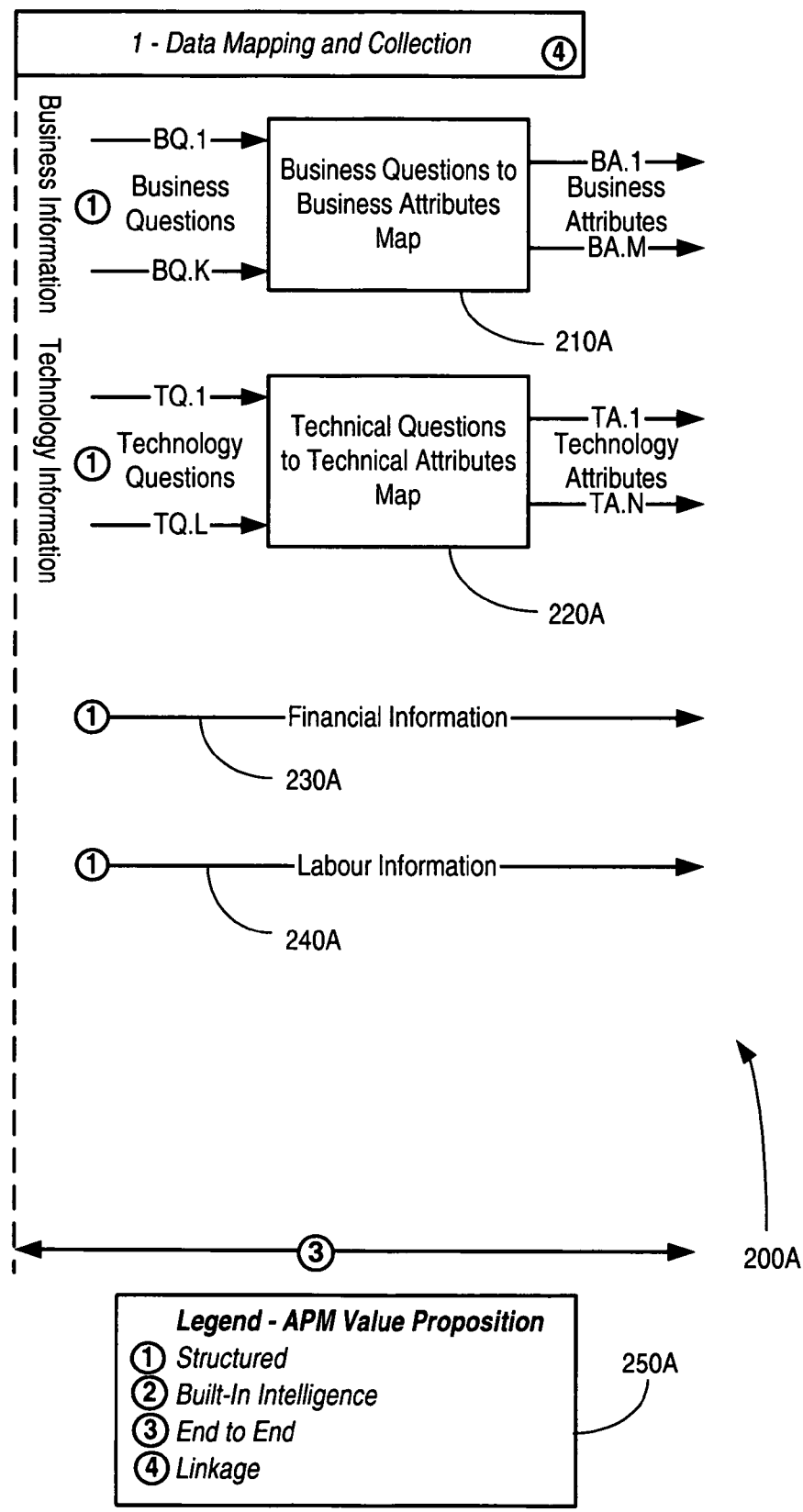
FIGS. 2A-2E show a schematic block diagram of an application balanced scorecard optimizer system in accordance with an embodiment.

FIG. 2A shows a Data Mapping and Collection first stage 200A. At this first stage 200A, data for the various decision drivers is collected for each application. As shown, the Business Driver may be modeled as a business driver module 210A that processes business questions and maps the business questions to corresponding business attributes. A plurality of Business Questions $BQ_1$-$BQ_K$ may be provided as inputs to the business driver module 210A. Based on a predefined map, the business driver module 210A may process answers to the plurality of Business Questions $BQ_1$-$BQ_K$ and map these to a plurality of Business Attributes $BA_1$-$BA_M$. The Business Attributes $BA_1$-$BA_M$ are provided as inputs to the second stage 200B, as discussed in greater detail with reference to FIG. 2B further below.

Still referring to FIG. 2A, at this first stage 200A, the technology driver may be modeled as a technology driver module 220A that processes a plurality of technology questions and maps these questions to corresponding technology attributes. A plurality of Technology Questions $TQ_1$-$TQ_L$ may be provided as inputs to the technology driver module 220A. Using a predefined map, the technology driver module 220A may process the Technology Questions $TQ_1$-$TQ_L$ and map them to Technology Attributes $TA_1$-$TA_N$. These Technology Attributes $TA_1$-$TA_N$ are provided as inputs to the second stage 200B shown in FIG. 2B.

Still referring to FIG. 2A, at the first stage 200A, the Financial Driver may be modeled as financial information 230A that is collected. The Labour Driver may be modeled as labour information 240A that is collected. As will be detailed below, the financial information 230A and the labour information 240A may be applied as inputs to each subsequent stage of the ABSCO system 200.

Still referring to FIG. 2A, a legend 250A provides information on which components or modules shown in FIG. 2A are respectively (1) structured, (2) have built-in intelligence, (3) are end-to-end, or (4) provide linkages.

Figure 2B:
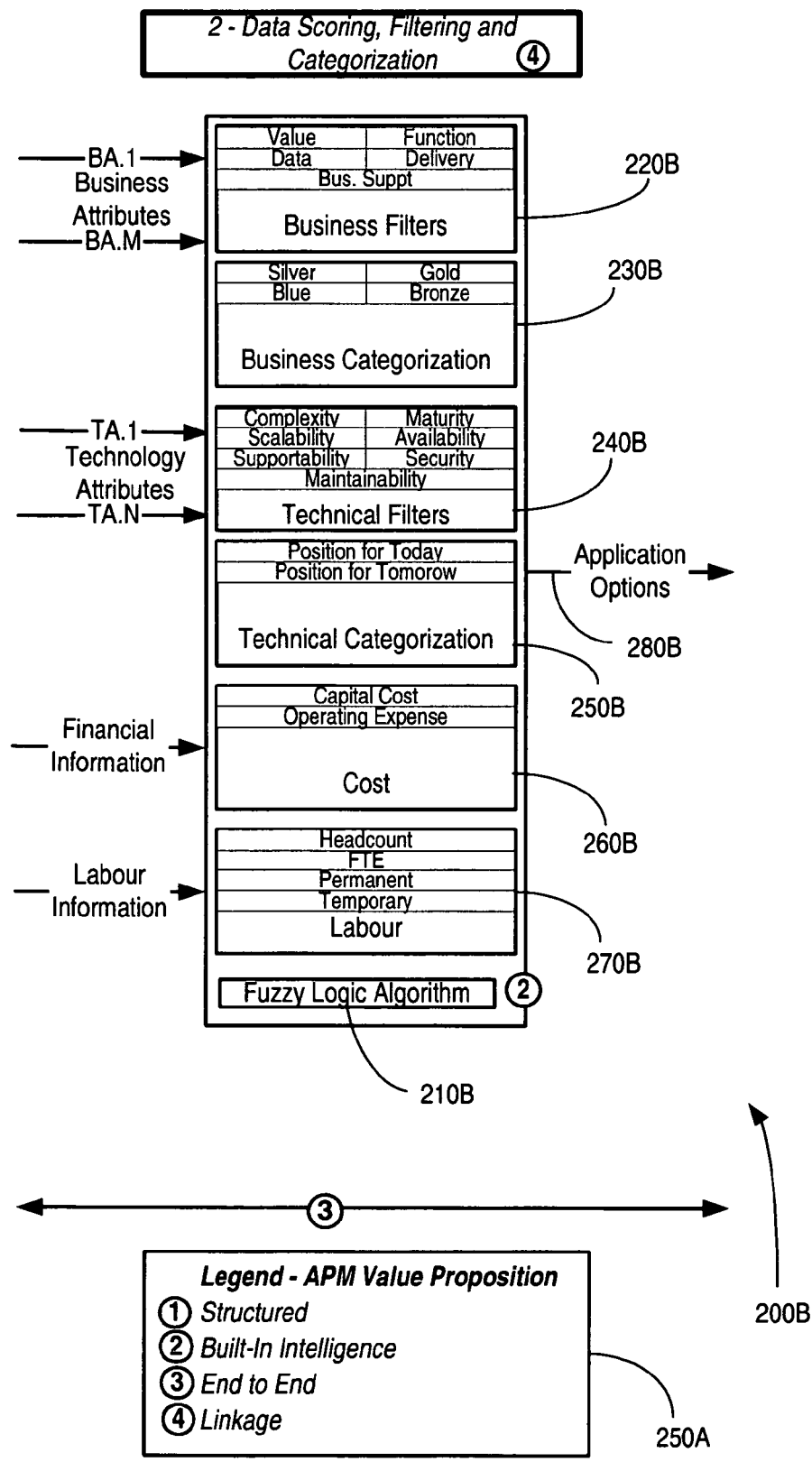

Now referring to FIG. 2B, shown is a Data Scoring, Filtering and Categorization second stage 200B of the ABSCO system 200. At this second stage 200B, the ABSCO system 200 receives as inputs the data or mapping from each of the decision drivers described above in the first stage for the ABSCO system 200, including Business Attributes $BA_1$-$BA_M$, Technology Attributes $TA_1$-$TA_N$, Financial Information 230A, and Labour Information 240A.

At this second stage 200B, Business Attributes $BA_1$-$BA_M$, may be provided as inputs to a business filters module 220B. The business filters module 220B may include various business filters such as a Value Filter, a Function Filter, a Data Filter, a Delivery Filter, and a Business Support Filter. For example, a Value Filter measures an application's value for business, such as satisfying requirements, contributing to enterprise growth, and fitting with operational processes and business strategy. A Function Filter measures how an application's functionality fits the business needs, such as completeness and quality of the business workflow that is implemented. A Data Filter measures how an application's data fits the business needs, such as completeness, accuracy, availability and accessibility. A Delivery Filter measures an application's delivery characteristics, such as architectural fit, manageability, performance, ability/uptime, scalability, security, required service level, and documentation. Finally, a Business Support Filter measures an application's support characteristics on the business side, such as user training, administration and coordination.

Business Attributes $BA_1$-$BA_M$, may also be provided as inputs to a business categorization module 230B. The business categorization module 230B measures an application's contribution to the data-to-day business and enterprise future.

Still referring to FIG. 2B, Technology Attributes $TA_1$-$TA_N$ may be provided as inputs to a technology filter module 240B. The technology filter module 240B may include various technology filters such as a Complexity Filter, a Maturity Filter, a Scalability Filter, an Availability Filter, a Supportability Filter, a Security Filter, and a Maintainability Filter. The technology filter module 240B measures various operational properties of the application. For example, a Complexity Filter reflects an application's complexity, a Maturity Filter reflects an application's maturity from the lifecycle point of view, and a Scalability Filter reflects an application's scalability.

The Technology Attributes $TA_1$-$TA_N$ may also be provided as inputs to a technology categorization module 250B. The technology categorization module 250B measures an application's current and future fit with the overall technology direction such as the position of a technology for today, and the position of a technology for tomorrow. For example, the position of technology today measures an application's fit with the current state of technology. The position of technology tomorrow measures an application's fit with the future direction of technology.

Still referring to FIG. 2B, financial information 240A collected at the first stage 200A may be provided as an input to a cost module 260B. The cost module 260B may include subcomponents such as Capital Cost and Operating Expense, for example.

Similarly, labour information 240A collected at the first stage 200A may be provided as an input to a labour module 270B. Labour module 270B may include subcomponents such as Headcount (H/C) and Full-Time Equivalent (FTE), which could be further broken down into Permanent and Temporary labour categories.

In an embodiment, at this second stage 200B, the ABSCO system 200 maintains an expert knowledge base in the form of a fuzzy logic algorithm 210B. This first fuzzy logic algorithm 210B captures, in a mathematical form, the application balanced scorecard patterns that have been observed and documented by experts. These patterns may be used by the various modules (business filters module 220B, business categorization module 230B, technology filter module 240B, technology categorization module 250B, cost module 260B, and labour module 270B) to process the various inputs and output one or more application options 280B.

Figure 2C:
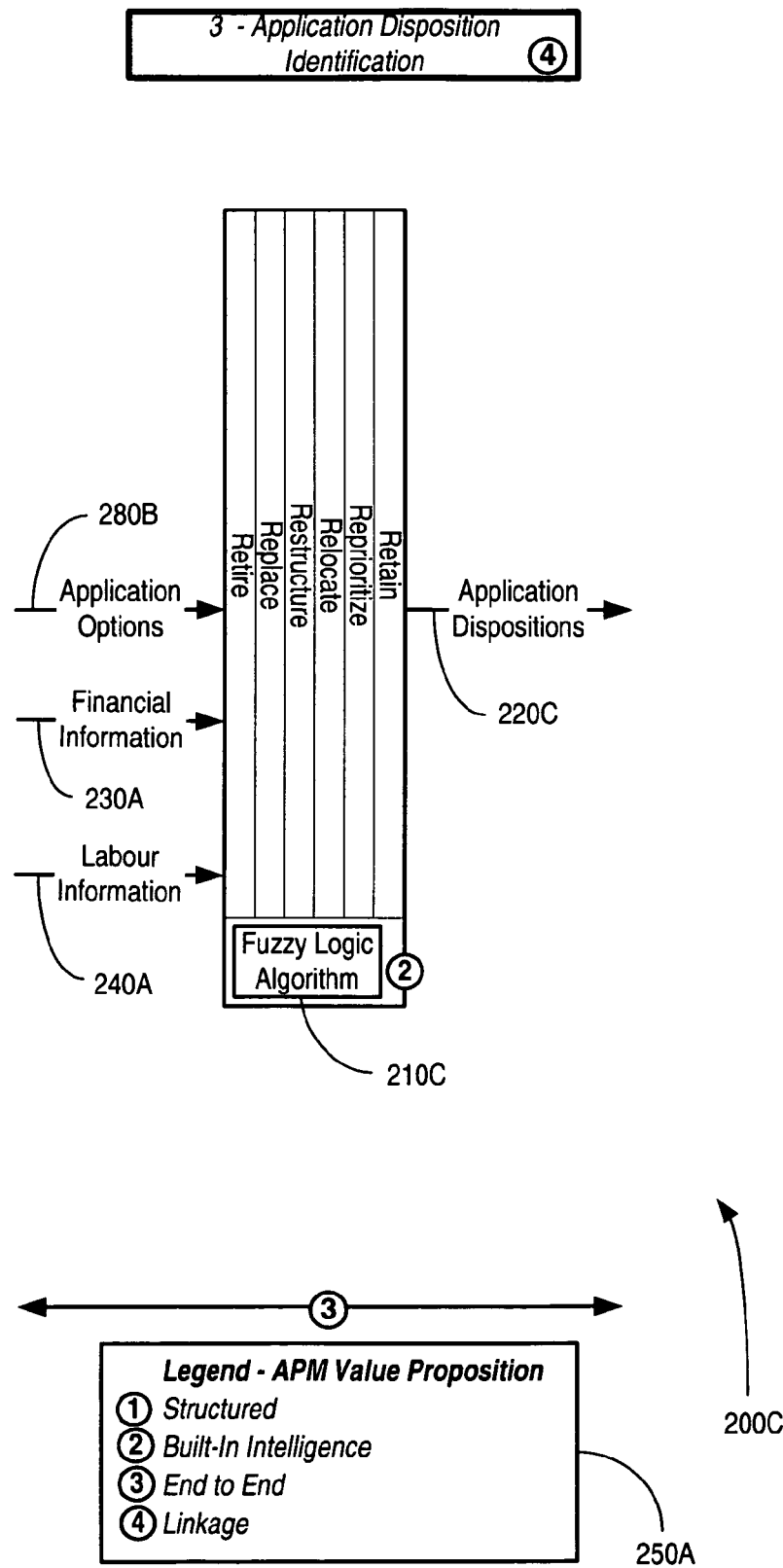

Now referring to FIG. 2C, shown is an Application Disposition and Identification third stage 200C. At the third stage 200C, the application option(s) 280B output from the second stage 200B is received as an input. Furthermore, financial information 230A and labour information 240A are provided as inputs to this third stage 200C.

At this third stage 200C, a second fuzzy logic algorithm 210C may be applied to process the various inputs, including application options 280B, financial information 230A, and labour information 240A. This fuzzy logic algorithm 210C may consider various aspects of an application including whether to Retain, Reprioritize, Relocate, Restructure, Replace, or Retire each application. Based on this application disposition identification, an output of application dispositions 220C may be sent to the next stage described below with reference to FIG. 2D.

Figure 2D:
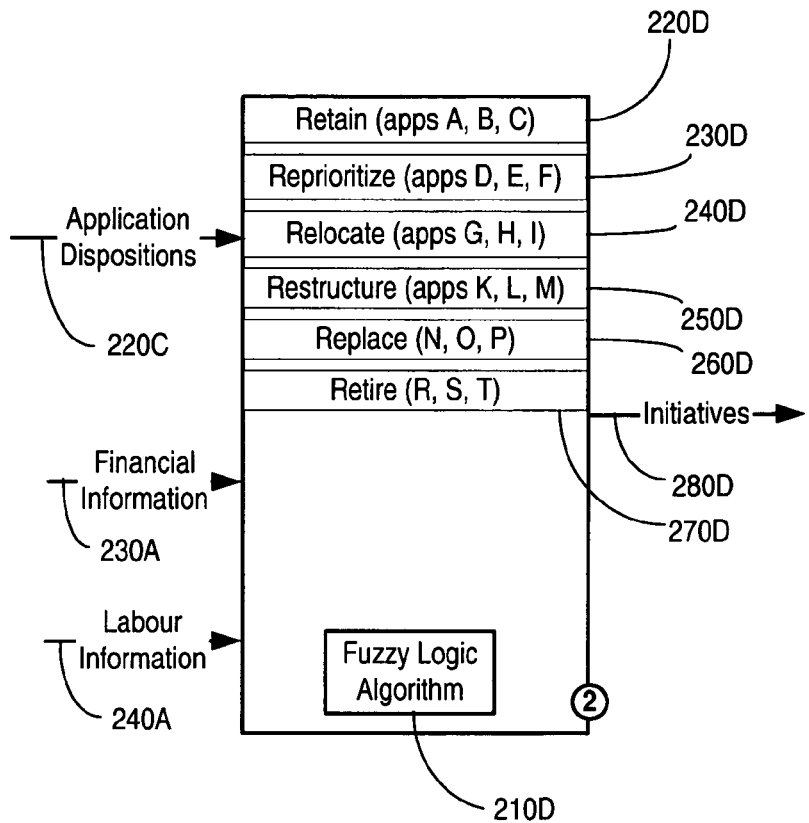
Figure 2D:
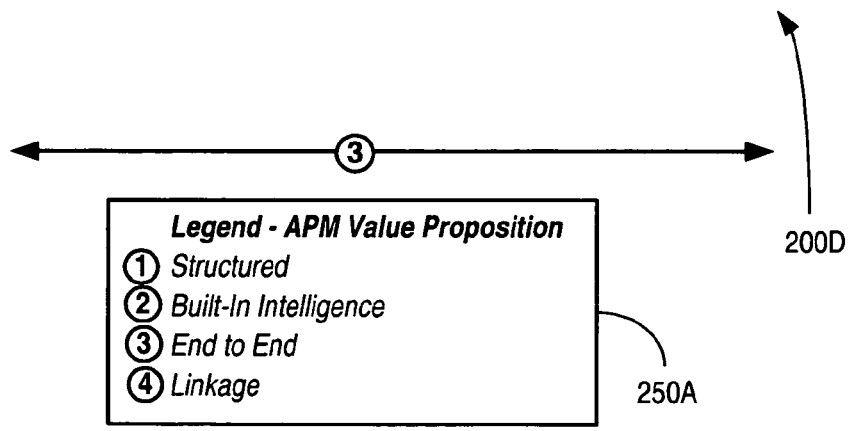

FIG. 2D shows an Application Disposition Bundling and Grouping fourth stage 200D. This fourth stage 200D receives as an input the application dispositions 220C from the third stage 200C. In addition, this fourth stage 200D receives financial information 230A and labour information 240A.

At the fourth stage 200D, a third fuzzy logic algorithm 210D may be provided to process the various application disposition 220B inputs. These application dispositions 220C may be bundled or grouped into one of a number of categories. For example, applications identified as A, B and C may be categorized in the Retain category 220D. Applications D, E and F may be categorized in the Reprioritize category 230D. Applications G, H and I may be categorized into a Relocate category 240D. Applications K, L and M may be categorized into a Restructure category 250D. Applications N, O and P may be categorized into a Replace category 260D.

Applications R, S and T may be categorized into a Retire category 270D. This set of disposition categories 220D-270D is illustrative, and it will be appreciated that various other sets of disposition categories may also be used. The output from the fourth stage 200D is a list of initiatives 280D that is provided as an input to the fifth stage 200E described below with reference to FIG. 2E.

Figure 2E:
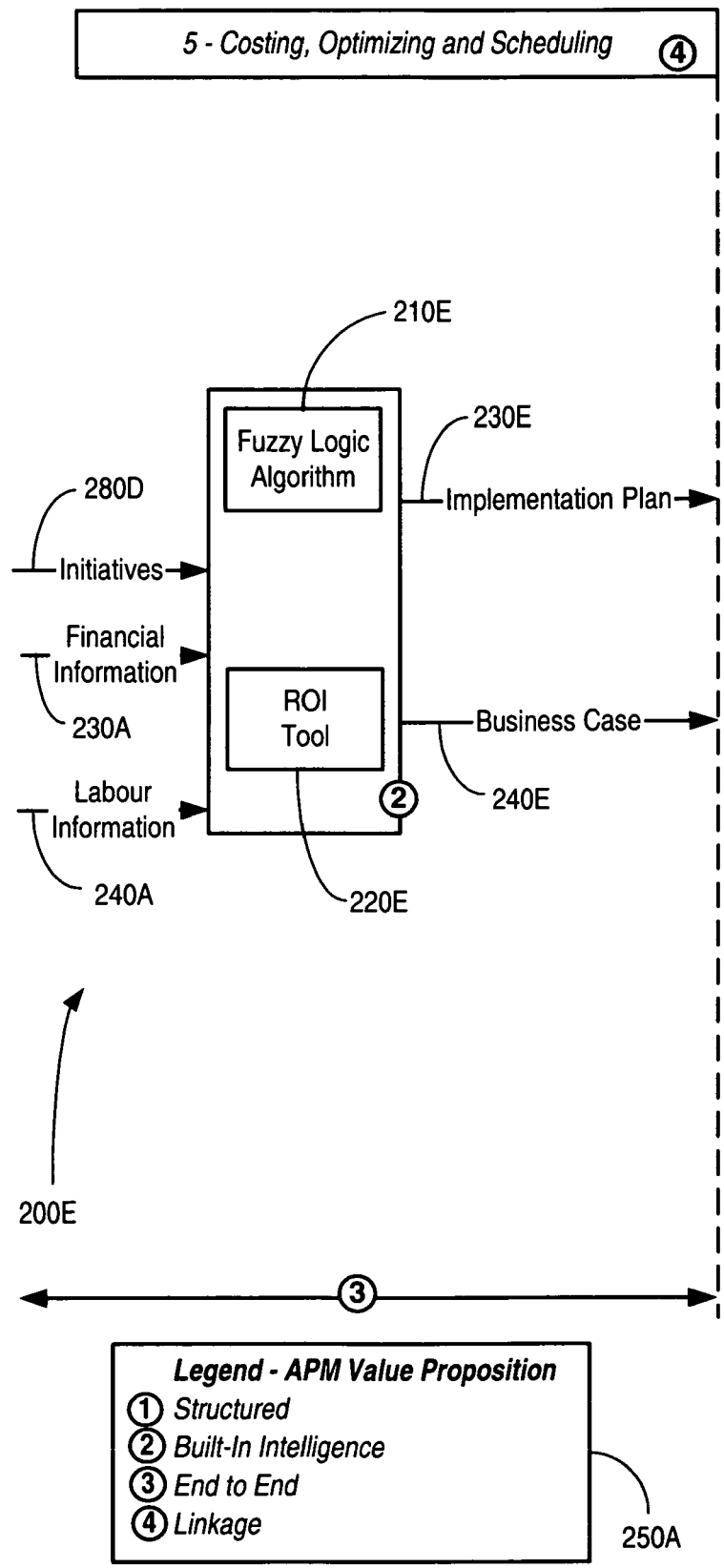

FIG. 2E shows a Costing, Optimizing and Scheduling fifth stage 200E. This fifth stage 200E receives as an input the initiatives 280D output from the fourth stage 200D. As well, the fifth stage receives financial information 230A and labour information 240A collected previously at the first stage 200A.

At the fifth stage 200E, a fourth fuzzy logic algorithm 210E and return on investment (ROI) evaluation tool 220E may be used to process the initiatives 280D received as an input. The output from this fifth stage 200E is an implementation plan 230E and a business case 240E.

As described above with respect to FIGS. 2A-2E, the ABSCO system 200 is designed to provide a balanced, cohesive, end-to-end approach to application portfolio management. Taking into account a number of critical decision drivers for application portfolio management (e.g. business drivers, technology drivers, financial drivers, and staffing/labour drivers), the ABSCO system 200 attempts to process this information into an actionable implementation plan together with a business case. The ABSCO system 200 provides a prescriptive method that directly links a number of factors (as discussed above) to provide a link between the problem and required action plan. Upon validation of the implementation plan and business case, one or more of the expert knowledge bases upon which the fuzzy logic algorithms are derived may be updated with further expert knowledge.

Figure 3C:
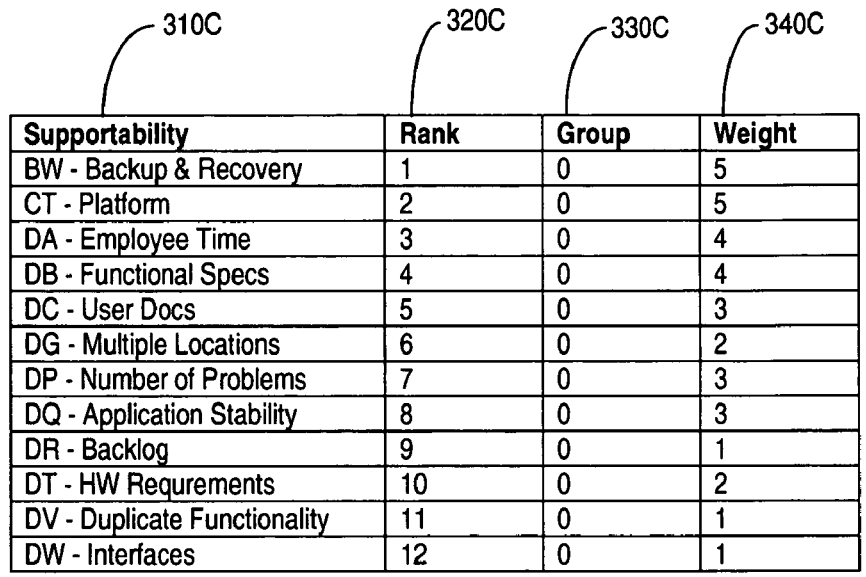

From the second stage to the fifth stage, there is an application of one or more fuzzy logic algorithms to process inputs and produce outputs. By way of illustration, FIGS. 3A-3E show an illustrative example of an optimization calculation performed at the second stage 200B (FIG. 2B above) in the technical categorization module 250B. As shown in FIG. 3A, a table 300A with a categories column 310A and an influence column 320A shows a number of factors that may be used to determine the priority of an application. As of "today", the factors most influencing priority may be operability at 50%, supportability at 30%, and maintainability at 20%.

As shown in table 300B of FIG. 3B, the operability criteria may be broken down further into its constituent parts. For example, operability may be determined by the various parts listed in column 310B. Each of these parts may also be ranked as shown in column 320B, grouped as shown in column 330B, and weighted as shown in column 340B. These rankings and weightings represent fuzzy set membership functions and associated logic as implemented by the fuzzy logic algorithms.

Similarly, as shown in table 300C of FIG. 3C, the supportability criteria may be broken down into its constituent parts. As shown in FIG. 3C, supportability may be determined by the various parts listed in column 310C. Each of these parts may be ranked as shown in column 320C, grouped as shown in column 330C, and weighted as shown in column 340C.

Figure 3D:
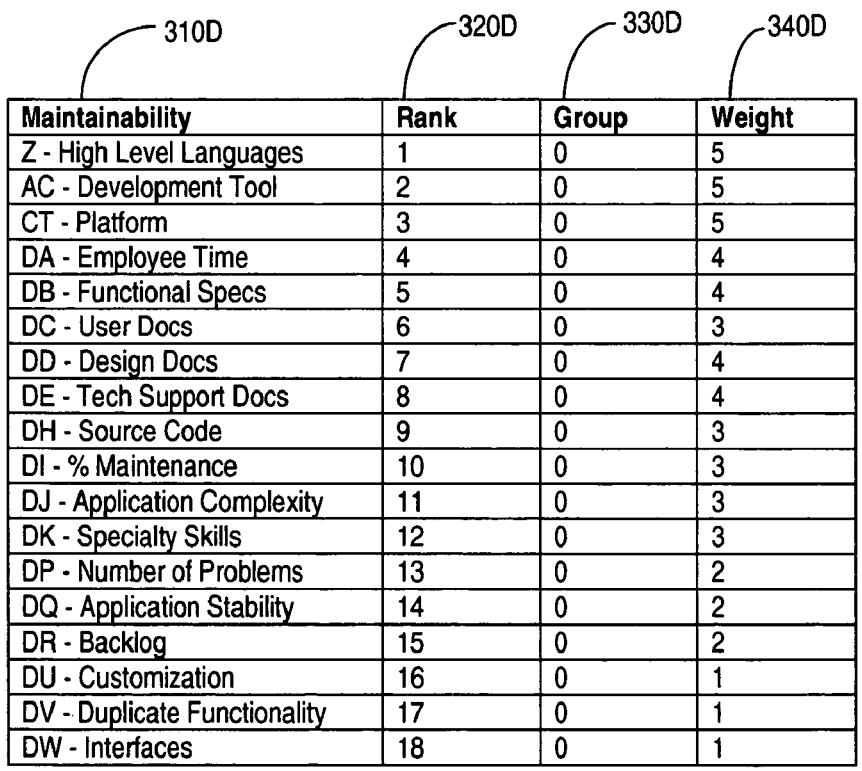

Finally, as shown in table 300D of FIG. 3D, the maintainability criteria may be broken down into its constituent parts as shown in column 310D. Each of these parts may be ranked as shown in column 320D, grouped as shown in column 330D, and weighted as shown in column 340D.

With the above breakdown, an application may be scored against each of the operability, supportability and maintainability criteria. For example, as shown in FIG. 3E, several applications may be scored against each of the constituent parts of the operability criteria 310E. As shown in column 320E, an application ABC may score strongly for one of the constituent parts, but may score weakly for other constituent parts. Some of the constituent parts may be totally irrelevant. For example, if the application is a background database application, the presentation layer may be irrelevant. As another example, column 330E shows the scores for another database application DEF. Again, one of the constituent parts may be very relevant to application DEF, but the others may be irrelevant. Column 340E shows another example of an application GHI which may be an application that interfaces directly with users. In this case, many of the constituent parts of the operability criteria may be relevant, and application GHI may be scored accordingly. The possible range of scores for each constituent part may be predetermined. These scores represent an illustrative fuzzy set membership function and associated logic as implemented by one of the fuzzy logic algorithms.

As illustrated in FIGS. 3A-3E, applications may be processed through various modules at one or more stages of the ABSCO system 200. While a particular example was shown, it will be appreciated that various other input data may be processed to produce an output at each stage of the ABSCO system 200.

Figure 4:
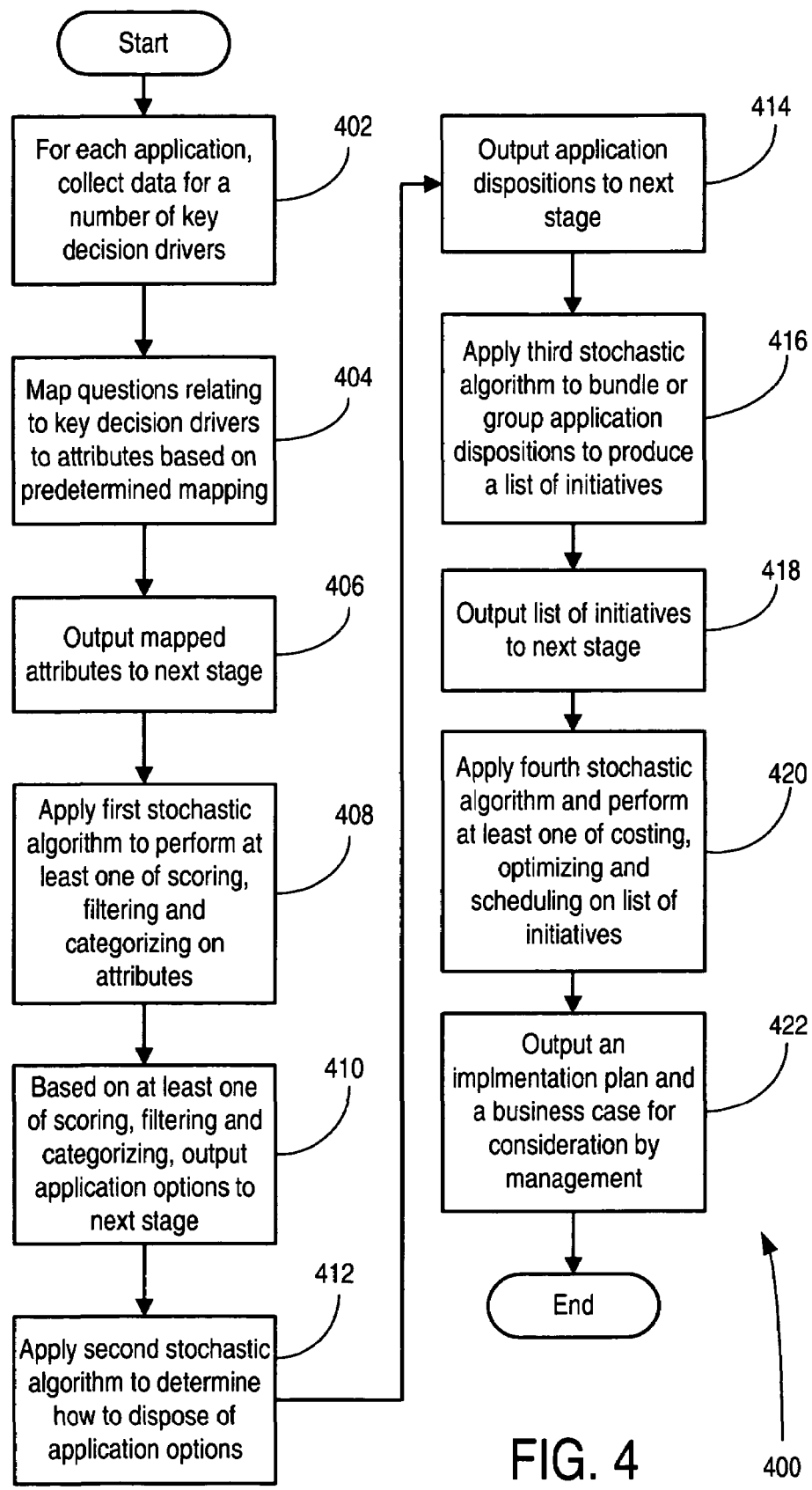
FIG. 4 shows a schematic flowchart of a method in accordance with an embodiment.

In an embodiment, the ABSCO system 200 described above may also be configured to practice a method for optimizing application portfolio management. Shown in FIG. 4 is a flowchart of an illustrative method 400 in accordance with an embodiment. Method 400 begins at block 402 where data for a number of key decision drivers (including Business, Technology, Labour and Financial data) is collected and associated with each application in a portfolio.

Method 400 then proceeds to block 404 where questions relating to some of these key decision drivers may be mapped to attributes based on a predetermined mapping. Method 400 then proceeds to block 406, where method 400 outputs the attributes mapped at block 404 to the next stage. At block 408, method 400 performs at least one of Scoring, Filtering and Categorizing on the attributes received at block 406 utilizing a first fuzzy logic algorithm. At block 410, as a result of the Scoring, Filtering and Categorizing at block 408, method 400 produces an output including a plurality of Application Options.

At block 412, the Application Options produced as an output at the previous stage are used as inputs to the next stage where a second fuzzy logic algorithm may be used to decide how to dispose of the plurality of Application Options. At block 414, method 400 may produce as an output a plurality of Application Dispositions.

At block 416, the Application Dispositions output at block 414 may be received as an input to the next stage. Applying a third fuzzy logic algorithm, the Application Dispositions may be bundled or grouped into one of the available Disposition Options. At block 418, a list of Initiatives may be produced as an output to the next stage. At block 420, method 400 may receive the list of Initiatives as an input to the next stage where Costing, Optimizing and Scheduling may take place. At block 422, the Costing, Optimizing and Scheduling that is performed using a fourth fuzzy logic algorithm results in the output of an implementation plan and a business case for consideration by managers of the application portfolio. Method 400 then ends.

As will be apparent, method 400 applies fuzzy logic algorithms to optimize application portfolio management in line with the business and technology strategies, and in view of the total cost of ownership of associated infrastructure. More generally, the method generates a set of measurements representing application value, functionality, data, delivery, business support, complexity, scalability, supportability, maturity, availability, security, maintainability, business category, technical category, cost (total cost of ownership) and labour. Method 400 may be practiced using the ABSCO system 200 as previously described.

In an embodiment, the method may further include generating a set of management reports and graphs illustrating application spending and investment focus, identifying outliners (i.e. management "eye openers"), dispositions and associated return on investment (ROI).

In another embodiment, the method may also allow changing measurements for selected applications or group of applications to determine the desired target state for the portfolio.

The aspects of the present invention can take the form of an entirely hardware embodiment, an entirely software embodiment or an embodiment containing both hardware and software elements. In a preferred embodiment, the aspect of the invention is implemented in software, which includes but is not limited to firmware, resident software, microcode, etc.

Furthermore, the aspect of the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of an aspect of the present invention has been presented for purposes of illustration and description, and is not intended to be exhaustive or limited to the aspects of the invention in the form disclosed. Many modifications and variations will be apparent to those of ordinary skill in the art. The embodiment was chosen and described in order to best explain the principles of the aspects of the invention, the practical application, and to enable others of ordinary skill in the art to understand the aspects of the invention for various embodiments with various modifications as are suited to the particular use contemplated. Thus, the scope of the invention is defined by the following claims.

What is claimed is:

1. A method for managing an application portfolio, comprising:

providing a first fuzzy logic algorithm, a second fuzzy logic algorithm, a third fuzzy logic algorithm and a fourth logic algorithm, each of the first fuzzy logic algorithm, the second fuzzy logic algorithm, the third fuzzy logic algorithm and the fourth fuzzy logic algorithm being derived from an adaptive and learning expert knowledge base;

for each application in the application portfolio, collecting data for a plurality of decision drivers;

processing questions relating to the decision drivers to output attributes based on a predetermined mapping;

applying the first fuzzy logic algorithm on the output attributes and performing scoring, and filtering and categorizing the output attributes; and based on performing said scoring, filtering and categorizing, outputting application options;

applying the second fuzzy logic algorithm to the output application options; and outputting application dispositions;

applying the third frizzy logic algorithm to said output application dispositions to group the output application options; and outputting a list of initiatives, and applying the fourth fuzzy logic algorithm to perform costing, optimizing and scheduling on the list of initiatives; and outputting an implementation plan and a business case.

2. The method of claim 1, further comprising maintaining each expert knowledge base in a mathematical form.

3. The method of claim 1, further comprising updating at least one expert knowledge base upon validation of the implementation plan and business case.

4. A system for managing an application portfolio, comprising:

means for providing a first fuzzy logic algorithm, a second frizzy logic algorithm, a third fuzzy logic algorithm and a fourth logic algorithm, each of the first fuzzy logic algorithm, the second fuzzy logic algorithm, the third fuzzy logic algorithm and the fourth frizzy logic algorithm being derived from an adaptive and learning expert knowledge base;

means for collecting data for a plurality of decision drivers for each application in the application portfolio;

means for processing questions relating to the decision drivers to output attributes based on a predetermined mapping;

means for applying first fuzzy logic algorithm on the output attributes and performing scoring and filtering and categorizing the output attributes; and means for outputting application options based on performing at least one of scoring, filtering and categorizing;

means for applying the second fuzzy logic algorithm to the output application options; and means for outputting application dispositions;

means for applying the third fuzzy logic algorithm to said output application dispositions to group the output application options; and means for outputting a list of initiatives;

means for applying the fourth fuzzy logic algorithm to perform costing, optimizing and scheduling on the list of initiatives; and means for outputting an implementation plan and a business case.

5. The system of claim 4, further comprising means for maintaining each expert knowledge base in a mathematical form.

6. The method of claim 4, further comprising means for updating at least one expert knowledge base upon validation of the implementation plan and business case.

7. The method of claim 1, wherein the adaptive and learning expert knowledge base comprises:

one or more fuzzy set membership functions associated with one or more of the first fuzzy logic algorithm, the second fuzzy logic algorithm, the third fuzzy logic algorithm, the fourth fuzzy logic algorithm;

a technology filter module comprising a complexity filter, a maturity filter, a scalability filter, an availability filter, a supportability filter, a security filter and a maintainability filter;

a technology categorization module measuring the application's current and future fit with an overall technology direction; and a labour module comprising a Headcount component and a Full-Time Equivalent component.

8. The system of claim 4, wherein the adaptive and learning expert knowledge base comprises:

one or more fuzzy set membership functions associated with one or more of the first fuzzy logic algorithm, the second fuzzy logic algorithm, the third fuzzy logic algorithm, the fourth fuzzy logic algorithm;

a technology filter module comprising a complexity filter, a maturity filter, a scalability filter, a availability filter, a supportability filter, a security filter and a maintainability filter;

a technology categorization module measuring the application's current and future fit with an overall technology direction; and a labour module comprising a Headcount component and a Full-Time Equivalent component.

* * * * *

UNITED STATES PATENT AND TRADEMARK OFFICE
CERTIFICATE OF CORRECTION

PATENT NO. : 7,689,529 B2
APPLICATION NO. : 11/400004
DATED : March 30, 2010
INVENTOR(S) : James S. Fung et al.

It is certified that error appears in the above-identified patent and that said Letters Patent is hereby corrected as shown below:

Title page, item (74) should be — Attorney, Agent, or Firm-Scully, Scott, Murphy & Presser, P.C.; William H. Steinberg Signed and Sealed this Twenty-fourth Day of August, 2010

David J. Kappos
*Director of the United States Patent and Trademark Office*